US008812040B2

(12) United States Patent
Liu et al.

(10) Patent No.: US 8,812,040 B2
(45) Date of Patent: Aug. 19, 2014

(54) COMMUNICATION SYSTEM, USER EQUIPMENT, BASE STATION, TRANSMIT POWER DECIDING METHOD, AND PROGRAM

(75) Inventors: Le Liu, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 438 days.

(21) Appl. No.: 13/141,284

(22) PCT Filed: Dec. 22, 2008

(86) PCT No.: PCT/JP2008/003889
§ 371 (c)(1),
(2), (4) Date: Jun. 21, 2011

(87) PCT Pub. No.: WO2010/073290
PCT Pub. Date: Jul. 1, 2010

(65) Prior Publication Data
US 2012/0009962 A1 Jan. 12, 2012

(51) Int. Cl.
*H04W 52/04* (2009.01)
*H04W 52/36* (2009.01)
*H04W 52/38* (2009.01)
*H04W 52/14* (2009.01)
*H04W 52/22* (2009.01)

(52) U.S. Cl.
CPC .......... *H04W 52/367* (2013.01); *H04W 52/365* (2013.01); *H04W 52/386* (2013.01); *H04W 52/146* (2013.01); *H04W 52/228* (2013.01); *H04W 52/226* (2013.01)
USPC ........ 455/509; 455/522; 455/450; 455/452.1; 455/69

(58) Field of Classification Search
USPC ............ 455/69, 522, 63.3, 70, 447, 525, 419, 455/445, 446, 515, 526, 517, 63.1, 63.2, 455/453, 450, 509, 67.11, 452.1; 370/338, 370/442, 462, 322, 461, 329, 335, 328, 312, 370/318; 375/219, 222, 260
See application file for complete search history.

(56) References Cited

U.S. PATENT DOCUMENTS 6,907,229 B2 * 6/2005 Shpak .............................. 455/69
8,194,579 B2 * 6/2012 Lee et al. ...................... 370/312

(Continued)

FOREIGN PATENT DOCUMENTS

| EP | 1 617 575 A1 | 1/2006 |
| JP | 2001285192 A | 10/2001 |
| WO | 2007/146561 A2 | 12/2007 |
| WO | 2008052195 A2 | 5/2008 |
| WO | 2008/123148 A1 | 10/2008 |

OTHER PUBLICATIONS

Motorola: "Cubic Metric in 3GPP-LTE", 3GP Draft; R1060023, 3rd Generation Partnershp Project (3GPP), Mobile Competence Centre; 650, Route Des Lucioles; F-06921 Sophia-Antipolis Cedex, France, Jan. 18, 2006, XP050111166, vol. RAN 2G1, No. Helsinki, Finland.

(Continued)

*Primary Examiner* — Tan Trinh
(74) *Attorney, Agent, or Firm* — Sughrue Mion, PLLC

(57) ABSTRACT

This invention has been accomplished in consideration of problems, and an object thereof is to provide a technology that enables a maximum transmit power suitable for each user equipment. This invention is a communication system, is characterized in deciding a maximum value of a transmit power of a user equipment by employing at least one of an access scheme and control information indicating a content of a communication control.

27 Claims, 4 Drawing Sheets

(56) References Cited

U.S. PATENT DOCUMENTS

| | | | |
|---|---|---|---|
| 2004/0057507 A1* | 3/2004 | Rotstein et al. | 375/219 |
| 2004/0192325 A1* | 9/2004 | Backes et al. | 455/453 |
| 2006/0251027 A1* | 11/2006 | Chun et al. | 370/335 |
| 2009/0011785 A1* | 1/2009 | Celebi et al. | 455/522 |
| 2009/0185531 A1* | 7/2009 | Chun et al. | 370/329 |
| 2009/0257394 A1* | 10/2009 | Chun et al. | 370/329 |
| 2010/0075704 A1* | 3/2010 | McHenry et al. | 455/509 |
| 2010/0157895 A1* | 6/2010 | Pani et al. | 370/328 |
| 2010/0158147 A1* | 6/2010 | Zhang et al. | 375/260 |
| 2011/0256902 A1* | 10/2011 | Celebi et al. | 455/522 |
| 2013/0028231 A1* | 1/2013 | Zhang et al. | 370/329 |

OTHER PUBLICATIONS

3rd Generation Partnership Project; Technical Specification Group Radio Access Network; Evolved Universal Terrestrial Radio Access (E-UTRA); Physical layer procedures (Release 8), 3GPP TS 36.213 v8.2.0, Mar. 2008.

3GPP TSG, "Proposals on PHY related aspects in LTE Advanced, Agenda item: 6.2", R1-081752, Ran1#53, NEC, May 5-9, 2008, Kansas City, MO, USA.

Office Action, Aug. 28, 2013, issued by the Japanese Patent Office in counterpart Japanese Application No. 2011-541721.

* cited by examiner

Fig. 4

| SD | BO(dB) |
|---|---|
| 1 | 0.8 |
| 2 | 1.3 |
| 3 | 1.5 |
| 4 | 1.7 |
| ⋮ | ⋮ |

Fig. 5

| MAX SD | BO(dB) |
|---|---|
| 1 | 0.8 |
| 2 | 1.3 |
| 3 | 1.5 |
| 4 | 1.7 |
| ⋮ | ⋮ |

Fig. 6

| ACCESS SCHEME | BO(dB) |
|---|---|
| SC-FDMA | 0 |
| OFDM | 2.4 |

COMMUNICATION SYSTEM, USER EQUIPMENT, BASE STATION, TRANSMIT POWER DECIDING METHOD, AND PROGRAM

CROSS REFERENCE TO RELATED APPLICATIONS

This application is a National Stage of International Application No. PCT/JP2008/003889 filed Dec. 22, 2008, the contents of all of which are incorporated herein by reference in their entirety.

TECHNICAL FIELD

The present invention relates to wireless communications, and more particularly to a technology for an uplink transmit power control.

BACKGROUND ART

In the uplink transmission of a cellular system, a baseband transmitting signal of a user equipment (UE) is loaded onto a radio frequency (RF) signal and transmitted through a power amplifier. The transmitted signal with a high peak-to-average power ratio (PAPR) would result in undergoing non-linear distortion of the power amplifier. In the case of the high PAPR, an increase in input back-off of the power amplifier is necessary to prevent the nonlinear distortion of the transmitted signal.

In Long Term Evolution (LTE) of the 3rd Generation Partnership Project (3GPP) (3GPP-LTE), the cubic metric (CM) is used to properly predict a power handling capability of the power amplifier (for example, Non-patent document [1]). For an uplink, single-carrier frequency division multiple access (SC-FDMA) is adopted as the uplink access scheme due to a low CM. In the LTE, the uplink power control is carried out, by using Math.1 (for example, Non-patent document [2]).

$$P_{PUSCH}(i) = \min\{P_{max}, 10\log_{10}(M_{PUSCH}(i)) + P_{O\_PUSCH}(j) + \alpha \cdot PL + \Delta_{TF}(TF(i)) + f(i)\}$$ [Math.1]

Here, each parameter is described follows.

$P_{PUSCH}(i)$ is the transmit power in dBm of the physical uplink shared channel (PUSCH) transmission in sub-frame.

$P_{MAX}$ is the maximum allowed power that depends on the UE power class.

$M_{PUSCH}(i)$ is the size of the PUSCH resource assignment expressed in the number of resource blocks valid for sub-frame i.

$P_{O\_PUSCH}(j)$ is a parameter composed of the sum of a 8-bit cell specific nominal component $P_{O\_NOMAL\_PUSCCH}(j)$ signalled from higher layers for j=0 and 1 in the range of [−126, 24] dBm with 1 dB resolution, and a 4-bit UE specific component $P_{O\_UE\_PUSCH}(j)$ configured by RRC for j=0 and 1 in the range of [−8, 7] dB with 1 dB resolution. For PUSCH (re)transmissions corresponding to a configured scheduling grant, then j=0, and for PUSCH (re)transmissions corresponding to a received PDCCH with a DCI format 0 associated with a new packet transmission, then j=1. $\alpha \in \{0, 0.4, 0.5, 0.6, 0.7, 0.8, 0.9, 1\}$ is a 3-bit cell specific parameter provided by higher layers.

PL is the downlink pathloss estimate calculated in the UE.

$\Delta_{TF}(TF(i)) = 10 \log_{10}(2^{MPR(i)}K_S - 1)$ for $K_S = 1.25$ and 0 for $K_S = 0$ where $K_S$ is a cell specific parameter given by RRC.

f(i) denotes the current PUSCH power control adjustment state in sub-frame i.

SC-FDMA has a low CM since it allows only continuous resource allocation. The continuous resource allocation is not flexible to achieve multiuser diversity, especially for wide-band communications. In DFT-spread-OFDM with discontinuous resource allocation (multi-carrier FDMA) (Non-patent document [3]), the discontinuous resource allocation is employed to achieve the multiuser diversity. The CM of DFT-S-OFDM increases gradually as the number of discontinuous spectrums is getting larger (Non-patent document 4). The CM of DFT-S-OFDM is dependent on the number of discontinuous spectrums.

On the other hand, Orthogonal Frequency Division Multiplexing (OFDM) scheme also allows the discontinuous resource allocation, but has a high CM. The adaptive access scheme of SC-FDMA and OFDM (Non-patent document [2]) employs OFDM to make use of multiuser diversity for high-geometry UEs and uses SC-FDMA to maintain the low CM for low-geometry UEs. A suitable access scheme is selected for the UE according to channel conditions. When the UE changes the access scheme from SC-FDMA to OFDM, the CM increases; while when the access scheme from OFDM to SC-FDMA is made, the CM reduces.

Non Patent Citation 1: 3GPP, R1-060023, Motorola "Cubic Metric in 3GPP-LTE," January 2006.
Non Patent Citation 2: 3GPP, TS 36.213.820
Non Patent Citation 3: 3GPP RAN1 R1-081752, "Proposals on PHY related aspects in LTE Advanced", NEC.

DISCLOSURE OF INVENTION

Technical Problem

The uplink power control should consider the power back-off from the maximum transmit power when each of the access schemes has a different CM. The higher CM needs an increase in the back-off from the maximum transmit power so as to prevent the non-linear distortion of the transmitted signal at the power amplifier. When the fixed back-off is used for the variable CM, too large back-off would reduce the power efficiency, and then estimate the user transmission capability. On the other hand, too small back-off would result in the link performance degradation due to the clipping at the power amplifier.

Thereupon, the present invention has been accomplished in consideration of the above-mentioned problems, and an object thereof is to provide a technology that sets a maximum transmit power suitable for each UE (User Equipment), which can also be called as mobile terminal.

Technical Solution

The present invention for solving the above-mentioned problems, which is a communication system, is characterized in deciding a maximum value of a transmit power of a UE by employing at least one of information related to access schemes and control information related to access control.

The present invention for solving the above-mentioned problems, which is a UE, is characterized in deciding a maximum value of a transmit power of its own device by employing at least one of information related to access schemes and control information related to access control.

The present invention for solving the above-mentioned problems, which is a base station, is characterized in notifying a maximum value of a transmit power of a UE decided by employing at least one of information related to access schemes and control information related to access control to the UE.

The present invention for solving the above-mentioned problems, which is a base station, is characterized in notifying modification information decided according to information related to access schemes or control information related to access control to the UE.

The present invention for solving the above-mentioned problems, which is a transmit power deciding method, is characterized in deciding a maximum value of a transmit power of a UE by employing at least one of information related to access schemes and control information related to access control.

The present invention for solving the above-mentioned problems, which is a program of a UE, is characterized in making the UE to execute a process of deciding a maximum value of a transmit power of its own device by employing at least one of information related to access schemes and control information related to access control.

The present invention for solving the above-mentioned problems, which is a program of a base station, is characterized in making the base station to execute a process of notifying a maximum value of a transmit power of a UE decided by employing at least one of information related to access schemes and control information related to access control to the UE.

The present invention for solving the above-mentioned problems, which is a program of a base station, is characterized in making the base station to execute a process of notifying modification information decided according to information related to access schemes or control information related to access control to the UE.

Advantageous Effect

The present invention makes it possible to set the maximum transmit power suitable for each UE.

BRIEF DESCRIPTION OF THE DRAWINGS

FIG. 4 shows one example of a table.
FIG. 5 shows one example of a table.
FIG. 6 shows one example of a table.

Figure 1:
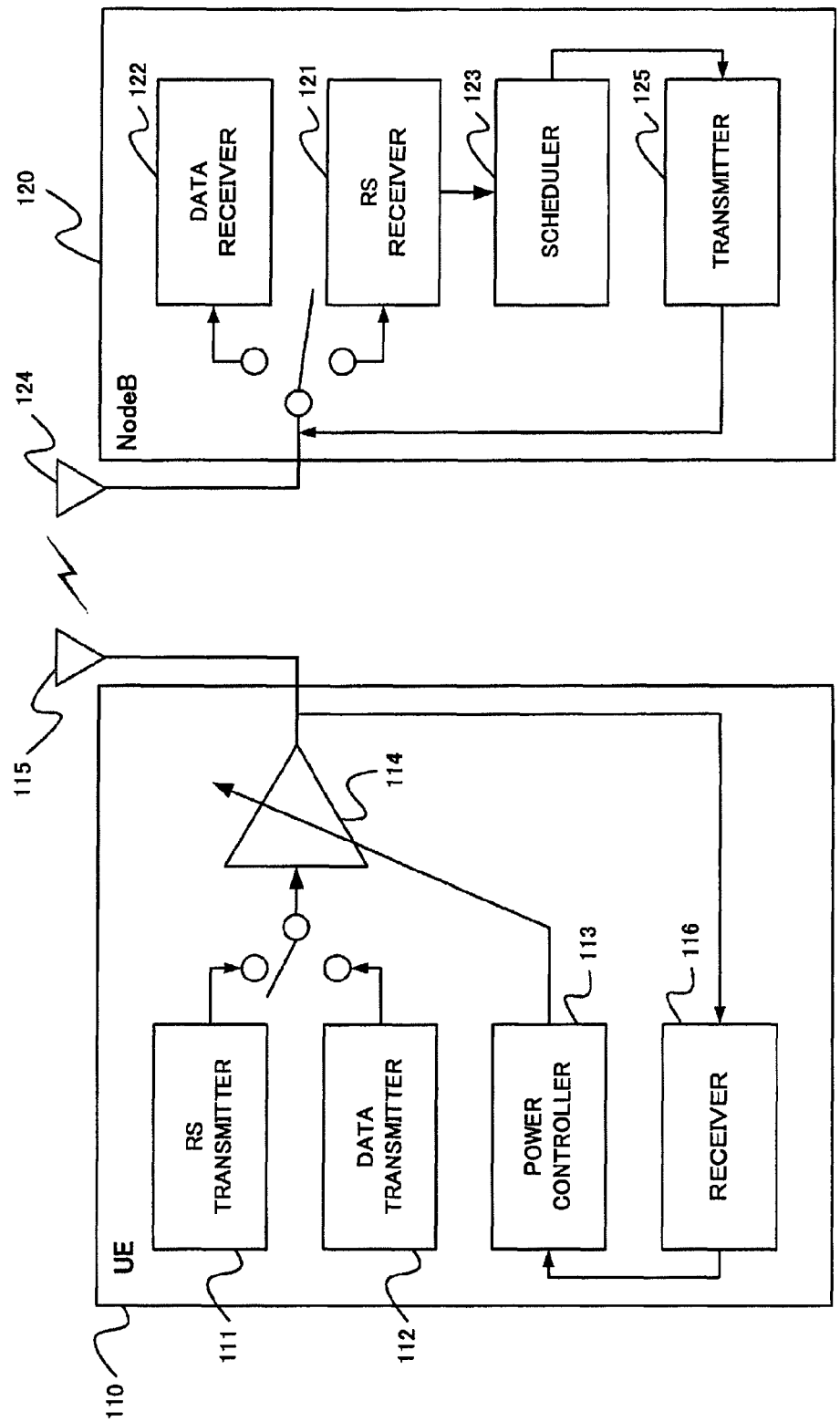
FIG. 1 shows one example of a block diagram of the present invention.

EXPLANATION OF REFERENCE 100 wireless communication system
110 UE (user equipment)
111 reference signal transmitter
112 data transmitter
113 transmit power controller
114 power amplifier
115 antenna
116 receiver
120 NodeB
121 reference signal receiver
122 data receiver
123 scheduler
124 antenna
125 transmitter

BEST MODE FOR CARRYING OUT THE INVENTION

So as to explain characteristics of the present invention, the best mode will be specifically explained hereinafter.

Mode for the Invention 1

The first embodiment in the present invention will be explained by making a reference to the accompanied drawings.

At first, a configuration of this embodiment will be explained. FIG. 1 is a schematic view of a wireless communication system 100 in the present invention. The wireless communication system 100 includes a UE (User Equipment) 110 and a NodeB 120.

The UE 110 includes a reference signal transmitter 111, a data transmitter 112, a transmit power controller 113, a power amplifier 114, an antenna 115, and a receiver 116.

The reference signal transmitter 111 generates a reference signal, and transmits it to the NodeB 120 via the antenna 115.

The data transmitter 112 generates an actual data, and transmits it to the NodeB 120 via the antenna 115.

The transmit power controller 113 keeps a table which shows the relationship between a parameter and a back-off (MPR: Maximum Power Reduction) value corresponding to each other. The transmit power controller 113 reads out the back-off value corresponding to the parameter shown in control information indicating the content of a communication control between the UE 110 and the NodeB from the table. Next, the transmit power controller 113 subtracts a portion equivalent to the value of the read-out back off from a nominal maximum transmit power quantity. This computation result is set as the uplink transmit power. The nominal maximum transmit power quantity is pre-decided, for example, corresponding to a capability of the UE etc. Additionally, the table may not be kept in transmit power controller 113, but it is enough that the table has been stored within the UE 110.

The power amplifier 114 sets the transmit power so that it becomes a value equal to or less than the maximum transmit power set by the transmit power controller 113.

The receiver 116 receives various kinds of the data or control information being transmitted from the NodeB 120.

The NodeB 120 is, for example, a base station. The NodeB 120 includes a reference signal receiver 121, a data receiver 122, a scheduler 123, and an antenna 124.

The reference signal receiver 121 receives a reference signal generated by the reference signal transmitter 111. And, it measures CQIs (channel quality indicator) of all of the resource blocks in the uplink from the received reference signal.

The data receiver 122 receives an actual data generated by the data transmitter 112.

The scheduler 123 carries out resource allocationbased on channel-dependent scheduling, namely, to allocate a resource block to the UE 110 based on the CQI measured by the reference signal receiver 121. And, it transmits scheduling information in PDCCH (Physical Down Link Control Channel) or PDSCH (Physical Down link Shared Channel) according to the result of the scheduling to the UE 110 via the antenna 124.

Figure 2:
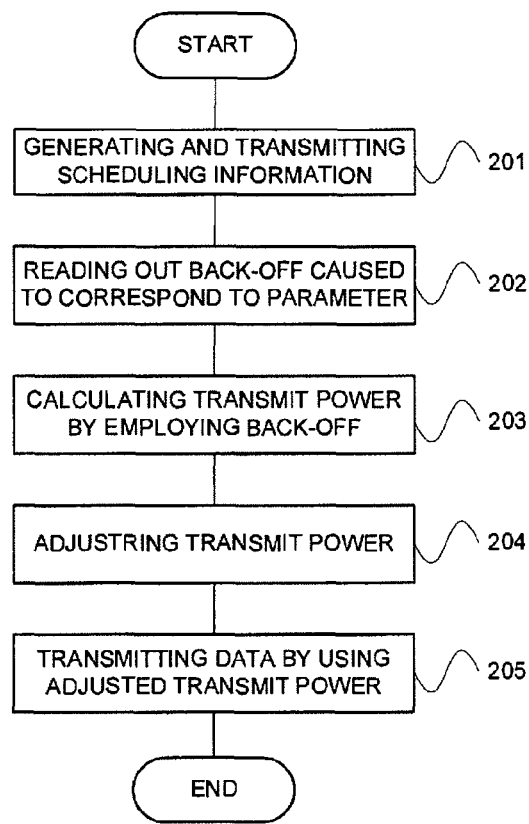
FIG. 2 is a flowchart for explaining an operation of a first embodiment.

In the following, an operation of the first embodiment will be explained by employing a flowchart of FIG. 2. Additionally, it is assumed that the uplink CQI has already been notified from the UE 110 to the NodeB in the following explanation.

The scheduler 123 of the NodeB 120 allocates the resource by employing the uplink CQI notified from the UE 110, and generates scheduling information (step 201). The scheduling information is transmitted via the antenna 124.

The transmit power controller 113 of the UE 110 extracts a parameter from the scheduling information received by the receiver 116, and reads out the back-off value corresponding to this parameter from the table (step 202). In addition the transmit power controller 113 subtracts a portion equivalent to the value of the read-out back-off from the nominal maximum transmit power, and sets this computation result as a maximum transmit power (step 203).

The power amplifier 114 sets the transmit power so that it becomes a value equal to or less than the maximum transmit power set by the transmit power controller 113 (step 204).

The various kinds of data or control information generated in the reference signal transmitter 111 or the data transmitter 112 are transmitted with the adjusted transmit power to the NodeB 120 (step 205).

Additionally, when the UE 110 has the table, the NodeB 120 may employ a PDCCH, a PBCH (physical broadcast channel) or a PDSCH, which includes signaling for notifying the scheduling information to UE 110. The information which be transmitted through PDSCH is notified by the higher layer. Further, when the back-off described in the table indicates the value to be reduced from the nominal maximum transmit power in the above explanation, the modification information of the maximum transmit power such as a ratio of the modified maximum transmit power over the nominal maximum transmit power value may be employed. Further, when the parameter is notified to the UE 110 in the above-mentioned explanation, a configuration in which the NodeB 120 keeps the table, reads out the back-off value corresponding to the parameter, and notifies the read-out back-off value to the UE 110, may be employed.

Example 1

Figure 3:
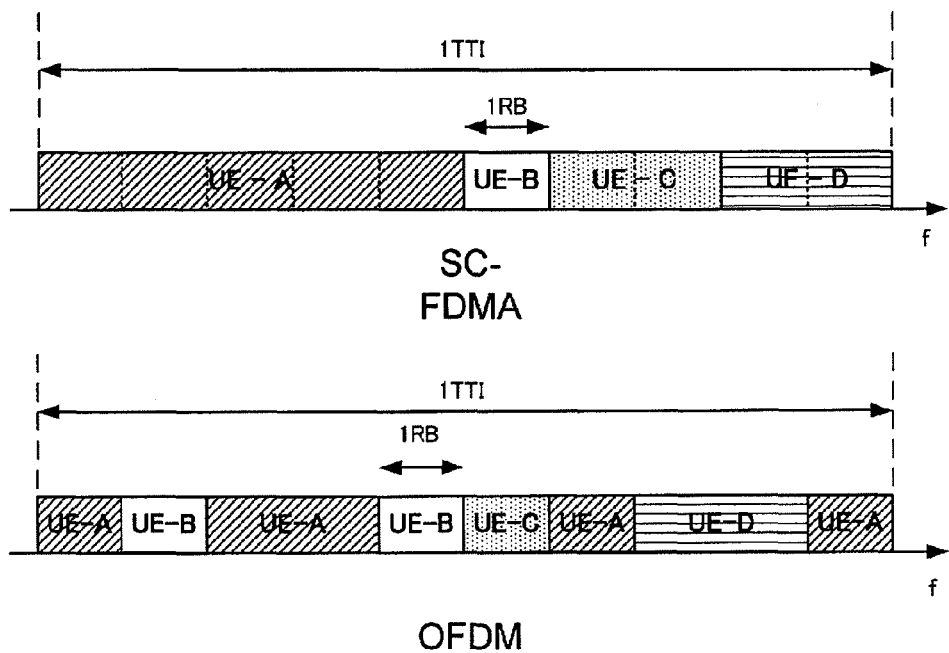
FIG. 3 is a view for explaining SD.

In the following, the example 1 in this embodiment will be explained. This example will be explained by employing the case that the parameter is a number of discontinuous resource block (RB) groups denoted as discontinuous spectrums (SD), where each discontinuous resource block group is consisted of one or several continuous resource blocks that have been allocated to an identical UE in frequency domain. For example, as shown in FIG. 3, in the resource block allocation of SC-FDMA (Single Carrier-Frequency Division Multiplexing Access), continuous resource blocks in frequency domain are allocated to each UE within 1TTI (Transmit Time Interval), and the SD of each UE becomes "1". On the other hand, in the resource block allocation of OFDM (Orthogonal Frequency Division Multiplex), discontinuous resource blocks in frequency domain are allocated to each UE. Thus, as shown in FIG. 3, the SD becomes "4" with UE-A, the SD becomes "2" with UE-B, and the SD becomes "1" with UE-C and UE-D, respectively.

FIG. 4 shows one example of a table being employed in this example. This table shows the relation ship between the number of discontinuous resource blocks (SD) and the back-off value (BO). An operation of this example will be explained shown in FIG. 4.

The scheduler 123 of the NodeB 120 allocates the resource by employing the uplink CQI notified from the UE 110, and generates scheduling information. The scheduling information is transmitted with PDCCH via the antenna 124. It is assumed that the SD allocated to the UE 110 is "2".

The transmit power controller 113 of the UE 110 recognizes from scheduling information received by the receiver 116 thar the number of the discontinuous resource blocks allotted is equal to "2". Then the transmit power controller 113 reads out from the table the back-off value corresponding to this number "2" of the discontinuous resource blocks. Here, it is assumed that "1.3" has been read out. Next, the transmit power controller 113 subtracts the value "1.3" of the read-out back-off from the nominal maximum transmit power value, and sets this computed result as a maximum transmit power.

The power amplifier 114 sets the transmit power so that it becomes a value equal to or less than the maximum transmit power set by the transmit power controller 113.

The various kinds of data or control information generated in the reference signal transmitter 111 or the data transmitter 112 are transmitted with the adjusted transmit power to the NodeB 120. Additionally, the SD may be notified with the PDCCH.

Making a configuration like this example enables the maximum transit power set to be suitable for communication environments or a capability etc. of the UE so that the maximum transit power is changed corresponding to the number of the continuous or discontinuous resource block groups allocated to the UE. Furthermore, a configuration of recognizing the SD from scheduling information does not necessitate transmitting extra information. In case that the information related to SD is transmitted through PDSCH or PDCCH, UE individual control is enabled as the information is transmitted to UE separately. Compared to the case of broadcast information, the information related to SD can be transmitted in short interval.

Example 2

In the following, the example 2 in this embodiment will be explained. This example will be explained by employing the case that the parameter is a maximum value of the discontinuous resource blocks, denoted as maximumSD (Max SD). This maximum value of the number of the discontinuous resource blocks is decided in NodeB, or UE. The scheduler 123 allocates the resource block to the UE 110 so that the value of the number of the discontinuous resource blocks becomes equal to or less than this MaxSD. The scheduler 123 of the NodeB may also set the maximum value of the discontinuous resource blocks according to information associated with communication environments of the UE 110 or the NodeB 120, information reflecting an influence of the communication environments, characteristics of the UE 110, a UE's position, geometry or a MCS (Modulation and Coding Scheme). The geometry shows, for example, average of SINR (Signal-to-Interference plus Noise Ratio) and is a function of the distance from the UE to the serving Node B and excludes fading and shadowing factors. The maximum value of the discontinuous resource blocks is informed to the UE 110 through PDCCH (Physical Downlink Control Channel) dynamically, or PDSCH (Physical Downlink Data Channel), or PBCH (Physical Broadcast Channel) or semi-dynamically. Here, dynamical informing can be, for example, frame-by-frame (TTI-by-TTI); while, the semi-dynamical informing can be, for example, as longer as 4 TTIs or 8 TTIs.

FIG. 5 shows one example of a table being employed in this example. This table shows the relationship between has the maximum number of the discontinuous resource blocks and the back-off value. An operation of this example will be explained by employing a table shown in FIG. 5. Additionally, the operation of this example will be explained by employing the case that the scheduler 123 of the NodeB sets the maximum value of the discontinuous resource blocks according to information associated with communication environments of the UE 110 or the NodeB 120, information reflecting an influence of the communication environments, characteristics of the UE 110, a UE's position, a geometry or a MCS (Modulation and Coding Scheme).

The scheduler 123 of the NodeB 120 sets the maximum number of the discontinuous resource blocks according to information associated with communication environments of the UE 110 or the NodeB 120, information reflecting an influence of the communication environments, or a communication capability. Here, it is assumed that the maximum number of the discontinuous resource blocks is "2". Further, the scheduler 123 allocates the resource by employing the uplink CQI notified from the UE 110, and generates scheduling information. The maximum number of the discontinuous resource blocks equal to "2" together with the scheduling information are transmitted via the antenna 124 to the UE 110.

The transmit power controller 113 of the UE 110 reads out the back-off value corresponding to the maximum number "2" of the discontinuous resource blocks received by the receiver 116 from the table. Here, it is assumed that "1.3" has been read out. Next, the transmit power controller 113 subtracts the value "1.3" of the read-out back-off from the nominal maximum transmit power value, and sets this computed result as the maximum transmit power.

The power amplifier 114 sets the transmit power so that it becomes a value equal to or less than the maximum transmit power set by the transmit power controller 113.

The various kinds of data or control information generated in the reference signal transmitter 111 or the data transmitter 112 are transmitted with the adjusted transmit power to the NodeB 120.

Making a configuration like this example enables the maximum transit power set to be suitable for communication environments or a capability etc. of the UE because the maximum transit power is changed according to the maximum number of discontinuous resource block groups allocated to the UE.

Example 3

In the following, the example 3 in this embodiment will be explained. This example will be explained by employing the case that the parameter is related to access scheme employed for data communication between the UE 110 and the NodeB 120. Although two kinds of OFDM and SC-FDMA are adopted as access schemes employed for explanation in this example, the type of access scheme is not limited hereto, and the access scheme of allowing discontinuous resource allocation can be DFT-S-OFDM (which is called clustered DFT-S-OFDM, NxDFT-S-OFDM, etc.), CDMA, MC-CDMA, etc. A combination of access schemes may be employed in combination of plural kinds, such as more than 3. When there are plural kind of the access schemes being employed for data communication between the UE and NodeB, a back-off value of each access scheme, the biggest back-off, the smallest-back off, or the average of plural back-off values is used. Furthermore, the access scheme employed for communication between the UE 110 and the NodeB 120 can also be cell-specific or UE-specific, similar to the case of Max SD. The information indicating the type of access scheme is informed through the PDCCH, the PDSCH, or the PBCH by a higher-layer signal to the UE 110 at the time of a communication start.

FIG. 6 shows one example of a table being employed in this example. This table shows the relation ship between the access scheme and the back-off value. An operation of this example will be explained by employing the table shown in FIG. 6.

The scheduler 123 of the NodeB 120 allocates the resource according the uplink CQI notified from the UE 110, and generates scheduling information. The scheduling information is transmitted via the antenna 124. Here, it is assumed that the NodeB 120 has decided to make communication using OFDM, and the number of discontinuous resource block group allocated to the UE 110 is "2".

The transmit power controller 113 of the UE 110 recognizes that the communication is made by using OFDM from the scheduling information received by the receiver 116. Then the transmit power controller 113 reads out the back-off value corresponding to OFDM from the table. Here, it is assumed that "2.4" has been read out. In addition hereto, the transmit power controller 113 subtracts the read-out back-off value "2.4" from the nominal maximum transmit power value, and sets this computed result as a maximum transmit power.

The power amplifier 114 sets the transmit power so that it becomes a value equal to or less than the maximum transmit power set by the transmit power controller 113.

The various kinds of data or control information generated in the reference signal transmitter 111 or the data transmitter 112 are transmitted with the adjusted transmit power to the NodeB 120.

A similar operation is conducted in the case that the NodeB 120 has decided to make communication using SC-FDMA.

Making a configuration like this example enables the maximum transit power set to be suitable for communication environments etc. because the maximum transit power is changed according to value access schemes.

Mode for the Invention 2

Next, the second embodiment will be explained. While the case that the UE 110 computes the maximum transmit power is explained in the above-mentioned embodiment, the case that the NodeB 120 computes the maximum transmit power is explained in this embodiment. The explanation of a configuration similar to that of the above-mentioned embodiment is omitted.

The scheduler 123 keeps the table, which shows the relationship between the parameter and the back-off value. The scheduler 123 generates control information indicating the content of communication between the UE 110 and the NodeB based on the CQI measured by the reference signal receiver 121. Furthermore, it reads out the back-off value corresponding to the parameter shown in this control information from the table, and subtracts a portion equivalent to the read-out back-off value from the nominal maximum transmit power value. This computed result together with the control information is informed through the PDCCH, the PDSCH, or the PBCH to the UE 110. Additionally, the nominal maximum transmit power quantity is decided, for example, according to the capability etc. of the UE 110, is notified from the UE 110 at the moment of an initial access. To be mentioned it that the table may not be kept in the transmit power controller 113 but stored within the UE 110.

The transmit power controller 113 of the UE 110 sets the uplink transmit power so that it becomes equal to or less than the maximum transit power that the receiver 116 has received together with the control information.

Figure 7:
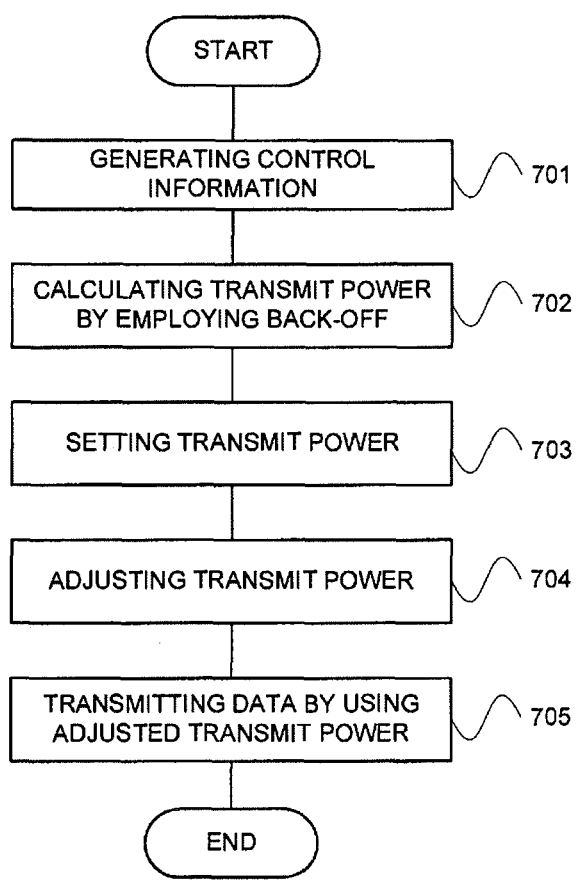
FIG. 7 is a flowchart for explaining an operation of a second embodiment.

Continuously, an operation of the second embodiment will be explained by employing a flowchart of FIG. 7. Additionally, the following explanation is made on the assumption that the CQI of the uplink has already been notified from the UE 110 to the NodeB.

The scheduler 123 of the NodeB 120 allocates the resource by employing the CQI of the uplink notified from the UE 110, and generates control information (step 701). Further, the scheduler 123 reads out the back-off value corresponding to the parameter shown in this control information from the table. And the scheduler 123 transmits the maximum transmit power calculated by subtracting a portion equivalent to the value of the read-out back off from the nominal maximum transmit power quantity together with the control information to the UE 110 (step 702).

The transmit power controller 113 of the UE 110 reads out the maximum transmit power received by the receiver 116, and sets it as a uplink maximum transmit power (step 703).

The power amplifier 114 sets the transmit power so that it becomes a value equal to or less than the maximum transmit power set by the transmit power controller 113 (step 704).

The various kinds of data or control information generated in the reference signal transmitter 111 or the data transmitter 112 are transmitted with the adjusted transmit power to the NodeB 120 (step 705).

Example 4

Continuously, the example 4 in this embodiment will be explained. This example will be explained by employing the case that the parameter is the number (SD) of the discontinuous resource blocks (Discontinuous Spectrums). A table being employed in this example is similar with that of the example 1 explained in the above-mentioned first embodiment. An operation of this example will be explained by employing the table shown in FIG. 4.

The scheduler 123 of the NodeB 120 allocates the resource by employing the uplink CQI notified from the UE 110, and generates the scheduling information. Here, it is assumed that the SD allocated to the UE 110 is "2". The scheduler 123 reads out the back-off value corresponding to the SD "2" allocated to the UE 110 from the table. Here, it is assumed that "1.3" has been read out. The scheduler 123 transmits the maximum transmit power calculated by subtracting a portion "1.3" equivalent to the value of the read-out back-off from the nominal maximum transmit power quantity together with the scheduling information to the UE 110.

The transmit power controller 113 of the UE 110 reads out the maximum transmit power received by the receiver 116, and sets it as an uplink maximum transmit power.

The power amplifier 114 sets the transmit power so that it becomes a value equal to or less than the maximum transmit power set by the transmit power controller 113.

The various kinds of data or control information generated in the reference signal transmitter 111 or the data transmitter 112 are transmitted with the adjusted transmit power to the NodeB 120.

Example 5

Continuously, the example 5 in this embodiment will be explained. This example will be explained by employing the case that the parameter is a maximum value (MaxSD) of the discontinuous resource block. A table being employed in this example is similar with that of the example 2 explained in the above-mentioned first embodiment. An operation of this example will be explained by employing the table shown in FIG. 5.

The scheduler 123 of the NodeB 120 sets the maximum number of the discontinuous resource blocks responding to information associated with communication environments of the UE 110 or the NodeB 120, information exerting an influence over the communication environments, or a communication capability. Here, it is assumed that the maximum number of the discontinuous resource blocks is "2". The scheduler 123 reads out the back-off value corresponding to MaxSD "2" from the table. Here, "1.3" is read out. Further, the scheduler 123 allocates the resource by employing the uplink CQI notified from the UE 110, and generates scheduling information. The maximum number "2" of the discontinuous resource blocks and the scheduling information are transmitted to the UE 110 via the antenna 124.

The transmit power controller 113 of the UE 110 reads out the back-off value corresponding to the maximum number "2" of the discontinuous resource blocks received by the receiver 116 from the table. Here, "1.3" is read out. The transmit power controller 113 transmits the maximum transmit power calculated by subtracting a portion "1.3" equivalent to the value of the read-out back-off from the nominal maximum transmit power quantity together with the scheduling information to the UE 110.

The transmit power controller 113 of the UE 110 reads out the maximum transmit power received by the receiver 116, and sets it as an uplink maximum transmit power.

The power amplifier 114 sets the transmit power so that it becomes a value equal to or less than the maximum transmit power set by the transmit power controller 113.

The various kinds of data or control information generated in the reference signal transmitter 111 or the data transmitter 112 are transmitted with the adjusted transmit power to the NodeB 120.

Example 6

In the following, the example 6 in this embodiment will be explained. This example will be explained by employing the case that the parameter is the access scheme being employed for communication between the UE 110 and the NodeB 120. The table employed in this example is similar with that of the example 3 explained in the above-mentioned first embodiment. An operation of this example will be explained by employing the table shown in FIG. 6.

The scheduler 123 of the NodeB 120 allocates the resource by employing the uplink CQI notified from the UE 110, and generates scheduling information. The scheduling information is transmitted via the antenna 124. Here, it is assumed that the NodeB 120 has decided to make communication using OFDM. The scheduler 123 reads out the back-off value corresponding to OFDM from the table. Here, "2.4" is read out. It transmits the maximum transmit power together with the scheduling information to the UE 110, where the maximum transmit power is calculated by subtracting a portion "2.4" equivalent to the read-out back-off value from the nominal maximum transmit power value.

The transmit power controller 113 of the UE 110 reads out the maximum transmit power received by the receiver 116, and sets it as the uplink maximum transmit power.

The power amplifier 114 sets the transmit power so that it becomes a value equal to or less than the maximum transmit power set by the transmit power controller 113.

The various kinds of data or control information generated in the reference signal transmitter 111 or the data transmitter 112 are transmitted with the adjusted transmit power to the NodeB 120.

Making a configuration like this embodiment enables the maximum transit power set to be suitable for communication environments or a capability etc. of the UE.

Mode for the Invention 3

The configuration in which the UE 110 calculated and set the uplink maximum transmit power by employing the nominal maximum transmit power and the back-off value was employed for explanation in the above-mentioned first embodiment. In this embodiment, a configuration of deciding the uplink transmit power by employing a newly-set maximum transmit power is employed for explanation. The explanation of a configuration similar to that of the above-mentioned embodiment is omitted.

The transmit power controller 113 keeps the table, which shows the relationship between the parameter and the back-off value. The transmit power controller 113 reads out from the table the back-off value corresponding to the parameter shown in the control information being transmitted from the NodeB 120. Then. And, it calculates the transmit power by inputting the read-out back-off into Math. 2.

$$P_{PUSCH}(i) = \min\{P_{max} - BO, 10\log_{10}(M_{PUSCH}(i)) + P_{O\_PUSCH}(j) + \alpha \cdot PL + \Delta_{TF}(TF(i)) + f(i)\} \quad \text{[Math.2]}$$

Here, each parameter is described follows.

$P_{PUSCH}$ (i) is the transmit power in dBm of the physical uplink shared channel (PUSCH) transmission in sub-frame.

$P_{max}$ is the nominal maximum transmit power that depends on the UE power class or UE characteristics.

BO is the power Back-Off from the maximum transmit power.

$M_{PUSCH}$ (i) is the size of the PUSCH resource assignment expressed in the number of resource blocks valid for sub-frame i.

$P_{O\_PUSCH}$ (j) is a parameter composed of the sum of a 8-bit cell specific nominal component $P_{O\_NOMAL\_PUSCCH}$ (j) signalled from higher layers for j=0 and 1 in the range of [−126, 24] dBm with 1 dB resolution, and a 4-bit UE specific component $P_{O\_UE\_PUSCH}$(j) configured by RRC for j=0 and 1 in the range of [−8, 7] dB with 1 dB resolution. For PUSCH (re)transmissions corresponding to a configured scheduling grant, then j=0, and for PUSCH (re)transmissions corresponding to a received PDCCH with a DCI format 0 associated with a new packet transmission, then j=1. $\alpha \in \{0, 0.4, 0.5, 0.6, 0.7, 0.8, 0.9, 1\}$ is a 3-bit cell specific parameter provided by higher layers.

PL is the downlink pathloss estimate calculated in the UE.

$\Delta_{TF}(TF(i)) = 10\log_{10}(2^{MPR(i)}K_S - 1)$ for $K_S = 1.25$ and 0 for $K_S = 0$ where $K_S$ is a cell specific parameter given by RRC.

f(i) denotes the current PUSCH power control adjustment state in sub-frame i.

Since the operation of this embodiment is similar with that of the first embodiment except for calculation of the transmit power, its explanation is omitted. Also, since an example of this embodiment as well is similar with each example of the first embodiment except for calculation of the transmit power, its explanation is omitted.

Making a configuration like this embodiment enables the UE to make communication with the transmit power set to be suitable for communication environments or a capability etc. of its own device.

Mode for the Invention 4

The configuration in which the NodeB 120 transmitted information associated with the back-off to the UE 110 was employed for explanation in the above-mentioned third embodiment. In this embodiment, a configuration in which the NodeB 120 transmits the maximum transmit power is employed for explanation. The explanation of a configuration similar to that of the above-mentioned third embodiment is omitted.

The scheduler 123 keeps the table, which shows the relationship between the parameter and the back-off value. The scheduler 123 allocates the resource block to the UE 110 based on the CQI measured by the reference signal receiver 121, and generates control information. Next, it reads out from the table the back-off value corresponding to the parameter shown in this control information, and then subtracts a portion equivalent to the read-out back-off value from the nominal maximum transmit power value. Finally, the scheduler computes a new maximum transmit power $P'_{max}$. This computation result together with the control information is informed through the PDCCH, the PDSCH, or the PBCH to the UE 110.

Additionally, the maximum transmit power value is pre-decided according to, for example, a capability of the NodeB 120 etc. Furthermore, the table may not be kept in transmit power controller 113, but stored within the UE 110.

The transmit power controller 113 of the UE 110 calculates the transmit power by inputting the new maximum transmit power $P'_{max}$ into Math. 3, where $P'_{max}$ is received by the receiver 116.

$$P_{PUSCH} = \min\{P'_{max}, 10\log_{10}(M_{PUSCH}(i)) + P_{O\_PUSCH}(j) + \alpha \cdot PL + \Delta_{TF}(TF(i)) + f(i)\} \quad \text{[Math.3]}$$

Here, each parameter is described follows.

$P_{PUSCH}$(i) is the transmit power in dBm of the physical uplink shared channel (PUSCH) transmission in sub-frame.

$P'_{max}$ is a new maximum transmit power which is the calculation result that subtracts a portion equivalent to the quantity of the BO from the nominal maximum transmit power quantity.

BO is the power Back-Off from the maximum transmit power.

$M_{PUSCH}$(i) is the size of the PUSCH resource assignment expressed in the number of resource blocks valid for sub-frame i.

$P_{O\_PUSCH}$(j) is a parameter composed of the sum of a 8-bit cell specific nominal component $P_{O\_NOMAL\_PUSCCH}$ (j) signalled from higher layers for j=0 and 1 in the range of [−126, 24] dBm with 1 dB resolution, and a 4-bit UE specific component $P_{O\_UE\_PUSCH}$(j) configured by RRC for j=0 and 1 in the range of [−8, 7] dB with 1 dB resolution. For PUSCH (re)transmissions corresponding to a configured scheduling grant, then j=0 and for PUSCH (re)transmissions corresponding to a received PDCCH with a DCI format 0 associated with a new packet transmission, then j=1. $\alpha \in \{0, 0.4, 0.5, 0.6, 0.7, 0.8, 0.9, 1\}$ is a 3-bit cell specific parameter provided by higher layers.

PL is the downlink pathloss estimate calculated in the UE.

$\Delta_{TF}(TF(i)) = 10 \log_{10}(2^{MPR(i)}K_S - 1)$ for $K_S=1.25$ and 0 for $K_S=0$ where $K_S$ is a cell specific parameter given by RRC.

f(i) denotes the current PUSCH power control adjustment state in sub-frame i.

Since the operation of this embodiment is similar with that of the third embodiment except for a calculation method of the transmit power, so its explanation is omitted. Also, since the example of this embodiment is similar with each example of the third embodiment except for the calculation method of the transmit power, its explanation is omitted.

Mode for the Invention 5

Next, the fifth embodiment will be explained. The case that the UE 110 computed the transmit power was explained in the above-mentioned third and fourth embodiments. This embodiment assumes a configuration in which the NodeB 120 computes the transmit power. Since the computation method of the transmit power of this embodiment is similar with that of each of the third and fourth embodiments, and each of a configuration and an operation thereof is similar with that of the second embodiment, its detailed explanation and explanation of the example are omitted.

Making a configuration like this embodiment enables the UE to make communication with the transmit power suitable for communication environments or a capability etc. of its own device.

Mode for the Invention 6

While, the UE and the NodeB of the present invention described above can be also configured of hardware, it is also possible to configure the UE with a computer program. A processor, which operates under a program filed in a program memory, allows a function and an operation similar to that of the foregoing embodiments to be realized. Additionally, it is also possible to realize a function of one part of the foregoing embodiment with the computer program.

The invention claimed is:

1. A communication system, characterized in deciding a maximum value of a transmit power of a user equipment by employing at least one of information related to access schemes and information related to a number of discontinuous resource block groups, wherein each of the discontinuous resource block groups comprises one or more continuous resource blocks allocated to said user equipment in a frequency domain.

2. The communication system according to claim 1, characterized in deciding said maximum value of said transmit power by employing modification information set responding to said information related to access schemes or said number of discontinuous resource block groups.

3. The communication system according to claim 1 or claim 2, characterized in deciding said maximum value of said transmit power by employing modification information responding to an access scheme, which is employed by said user equipment for data communication.

4. The communication system according to claim 1 or claim 2, characterized in deciding said maximum value of said transmit power by employing modification information set responding to said number of discontinuous resource block groups.

5. The communication system according to claim 4, characterized in deciding said maximum value of said transmit power by employing said modification information responding to a maximum number of said discontinuous resource block groups.

6. The communication system according to claim 1, characterized in deciding said transmit power of said user equipment by employing said decided maximum value.

7. A user equipment, characterized in deciding a maximum value of a transmit power of its own device by employing at least one of information related to access schemes and information related to a number of discontinuous resource block groups, wherein each of the discontinuous resource block groups comprises one or more continuous resource blocks allocated to said user equipment in a frequency domain.

8. The user equipment according to claim 7, characterized in deciding said maximum value of said transmit power by employing modification information set according to said information related to access schemes or said number of discontinuous resource block groups.

9. The user equipment according to claim 7 or claim 8, characterized in deciding said maximum value of said transmit power by employing modification information responding to an access scheme, which is employed by said user equipment for data communication.

10. The user equipment according to claim 7 or claim 8, characterized in deciding said maximum value of said transmit power by employing modification information responding to said number of discontinuous resource block groups.

11. The user equipment according to claim 10, characterized in deciding said maximum value of said transmit power by employing modification information responding to a maximum number of said discontinuous resource block groups.

12. The user equipment according to claim 7, characterized in deciding said maximum value of said transmit power by employing modification information decided responding to said information related to said access schemes or control information by a base station.

13. The user equipment according to claim 7, characterized in deciding said transmit power of said user equipment by employing said decided maximum value.

14. A base station, characterized in notifying a maximum value of a transmit power of a user equipment decided by employing at least one of information related to access schemes and information indicating a number of discontinuous resource block groups, wherein each of the discontinuous resource block groups comprises one or more continuous resource blocks allocated to said user equipment in a frequency domain.

15. A base station, characterized in notifying, to said user equipment, modification information decided according to information related to access schemes or information related to a number of discontinuous resource block groups, wherein each of the discontinuous resource block groups comprises one or more continuous resource blocks allocated to said user equipment in a frequency domain.

16. The base station according to claim 15, characterized in notifying modification information decided responding to said number of discontinuous resource block groups.

17. The base station according to claim 16, characterized in notifying modification information decided responding to a maximum number of said discontinuous resource block groups.

18. The base station according to claim 15 or claim 16, characterized in notifying modification information decided responding to an access scheme that said user equipment employs for data communication.

19. A transmit power deciding method, characterized in deciding a maximum value of a transmit power of a user equipment by employing at least one of information related to access schemes and information related to a number of discontinuous resource block groups, wherein each of the discontinuous resource block groups comprises one or more continuous resource blocks allocated to said user equipment in a frequency domain.

20. The transmit power deciding method according to claim 19, characterized in deciding said maximum value of said transmit power by employing modification information set responding to said information related to access schemes or said number of discontinuous resource block groups.

21. The transmit power deciding method according to claim 19 or claim 20, characterized in deciding said maximum value of said transmit power by employing modification information responding to an access scheme that said user equipment employs for data communication.

22. The transmit power deciding method according to claim 19 or claim 20, characterized in deciding said maximum value of said transmit power by employing modification information set responding to said number of discontinuous resource block groups.

23. The transmit power deciding method according to claim 21, characterized in deciding said maximum value of said transmit power by employing said modification information responding to a maximum number of said discontinuous resource block groups.

24. A transmit power deciding method according to claim 19, characterized in deciding said transmit power of said user equipment by employing said decided maximum value.

25. A non-transitory computer-readable medium having stored thereon a program configured to control of a user equipment to perform a method comprising:
deciding a maximum value of a transmit power of its own device by employing at least one of information related to access schemes and control information indicating a number of discontinuous resource block groups, wherein each of the discontinuous resource block groups comprises one or more continuous resource blocks allocated to said user equipment in a frequency domain.

26. A non-transitory computer-readable medium having stored thereon a program configured to control a base station to perform a method comprising: notifying, to said terminal, a maximum value of a transmit power of a user equipment decided by employing at least one of information related to access schemes and information indicating a number of discontinuous resource block groups, wherein each of the discontinuous resource block groups comprises one or more continuous resource blocks allocated to said user equipment in a frequency domain.

27. A non-transitory computer-readable medium having stored thereon program configured to control of a base station to perform a method comprising: notifying modification information decided according to information related to access schemes or information a number of discontinuous resource block groups, wherein each of the discontinuous resource block groups comprises one or more continuous resource blocks allocated to said user equipment in a frequency domain.

* * * * *

UNITED STATES PATENT AND TRADEMARK OFFICE
CERTIFICATE OF CORRECTION

PATENT NO. : 8,812,040 B2  
APPLICATION NO. : 13/141284  
DATED : August 19, 2014  
INVENTOR(S) : Le Liu et al.

Page 1 of 1

It is certified that error appears in the above-identified patent and that said Letters Patent is hereby corrected as shown below:

In the Claims,

Column 15, Line 25: In Claim 23, delete "claim 21," and insert -- claim 22, --

Column 16, Line 2: In Claim 25, after "control" delete "of"

Column 16, Line 6: In Claim 25, after "and" delete "control"

Column 16, Line 23: In Claim 27, after "control" delete "of"

Column 16, Line 26: In Claim 27, after "information" insert -- related to --

Signed and Sealed this
Twentieth Day of January, 2015

Michelle K. Lee
*Deputy Director of the United States Patent and Trademark Office*